United States Patent
Moren et al.

(10) Patent No.: US 10,640,656 B2
(45) Date of Patent: May 5, 2020

(54) PRIMER COMPOSITION AND ARTICLES MADE THEREFROM

(71) Applicant: 3M INNOVATIVE PROPERTIES COMPANY, St. Paul, MN (US)

(72) Inventors: Dean M. Moren, North St. Paul, MN (US); David T. Amos, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 23 days.

(21) Appl. No.: 16/061,356

(22) PCT Filed: Dec. 6, 2016

(86) PCT No.: PCT/US2016/065090
§ 371 (c)(1),
(2) Date: Jun. 12, 2018

(87) PCT Pub. No.: WO2017/105918
PCT Pub. Date: Jun. 22, 2017

(65) Prior Publication Data
US 2018/0362775 A1 Dec. 20, 2018

Related U.S. Application Data

(60) Provisional application No. 62/268,794, filed on Dec. 17, 2015.

(51) Int. Cl.
*C09D 5/00* (2006.01)
*C09D 153/02* (2006.01)
*C09D 133/26* (2006.01)
*C08F 220/18* (2006.01)
*C08F 220/14* (2006.01)

(52) U.S. Cl.
CPC ........... *C09D 5/002* (2013.01); *C09D 133/26* (2013.01); *C09D 153/02* (2013.01); *C08F 220/14* (2013.01); *C08F 220/18* (2013.01)

(58) Field of Classification Search
None
See application file for complete search history.

(56) References Cited

U.S. PATENT DOCUMENTS

| | | | |
|---|---|---|---|
| 5,677,376 A | 10/1997 | Groves | |
| 6,310,134 B1* | 10/2001 | Templeton | C08F 8/00 524/531 |
| 2014/0243446 A1* | 8/2014 | Turk | G03G 9/0804 523/122 |
| 2015/0259576 A1* | 9/2015 | Yutou | C09J 133/08 428/41.3 |

FOREIGN PATENT DOCUMENTS

| | | |
|---|---|---|
| EP | 0341578 | 11/1989 |
| EP | 0360152 | 3/1990 |
| GB | 1053791 | 1/1967 |

OTHER PUBLICATIONS

"Index of Chemicals, Immediately Dangerous to Life or Health (IDLH) Values", Centers for Disease Control and Prevention, [retrieved from the internet on Jul. 19, 2018], URL <http://www.cdc.gov/niosh/idlh/intridl4.htm>, pp. 1-24.
"List of Exempt Compounds", [retrieved from the internet on Jul. 19, 2018], URL <http://www.cdpr.ca.gov/docs/emon/vocs/vocproj/2voc_exempt_list.pdf >, p. 1.
International Search Report for PCT International Application No. PCT/US2016/065090, dated Mar. 10, 2017, 4 pages.

* cited by examiner

Primary Examiner — Robert T Butcher
(74) Attorney, Agent, or Firm — Steven A. Bern

(57) ABSTRACT

There are provided primer compositions comprising a primer component comprising: a rubber; an amine-functional (meth)acrylic resin; and a plasticizer. There are also provided articles made using these primer compositions.

16 Claims, No Drawings

PRIMER COMPOSITION AND ARTICLES MADE THEREFROM

CROSS REFERENCE TO RELATED APPLICATIONS

This application is a national stage filing under 35 U.S.C. 371 of PCT/US2016/065090, filed Dec. 6, 2016, which claims the benefit of U.S. Provisional Application No. 62/268,794, filed Dec. 17, 2015, the disclosure of which is incorporated by reference in its/their entirety herein.

FIELD

This disclosure relates to a primer composition comprising a primer component. The present disclosure also relates to a primer composition having a primer component and a liquid carrier.

BACKGROUND

Low surface energy substrates such as polyethylene, polypropylene, and other polyolefins are characterized as having critical surface tensions of wetting of about 35 dynes/cm or less. Such surfaces are generally unreceptive to inks, paints, and adhesives due to their poor wettability. There is a need to improve adhesion to such surfaces, as well as to high energy surfaces.

Some tapes afford very high bond strengths to a wide variety of clean substrates. In some instances, primers may be applied before bonding to ensure maximum bond strength, which can be desirable for some applications. Use of some conventional primers may be complicated by various factors, including government regulations and detrimental effects to substrates, such as for example, crazing and corrosion.

Commercially available primers, such as those known as universal primers, advertise adhesion to low surface energy, medium surface energy, and high surface energy substrates including polypropylene, thermoplastic polyolefin, ABS, Nylon, acrylic, polycarbonate, paints, stainless steel, and aluminum. These primers often comprise aromatic solvents (e.g. xylene, toluene, ethylbenzene, chlorobenzene), halogen-based compounds (e.g. chlorinated polyolefin), and Bisphenol A-based compounds (e.g. epoxy resin).

There is a need for primer compositions comprising a primer component that provide strong adhesion to a wide range of low surface energy, medium surface energy, and high surface energy surfaces that are substantially free of aromatic solvents, halogen compounds, and Bisphenol A-based compounds. There is also a need for these primer compositions to provide strong adhesion between double sided tapes, such as for example, double sided foam tapes, and a wide range of surfaces.

SUMMARY

The present disclosure provides primer compositions comprising a non-volatile primer component that provide strong adhesion to a wide range of low surface energy, medium surface energy, and high surface energy surfaces and that are substantially free of aromatic solvents, halogen compounds, and Bisphenol A-based compounds. The present disclosure also provides such primer compositions having strong adhesion between double sided tapes, such as for example, double sided foam tapes, and a wide range of surfaces.

In one aspect, the present disclosure provides a primer composition comprising a primer component comprising: a rubber; an amine-functional (meth)acrylic resin; and a plasticizer. In some embodiments, the amine-functional (meth)acrylic resin is a polymerization reaction product of an amine-functional (meth)acryloyl compound and a non-amine-vinyl monomer; wherein the amine-functional (meth)acryloyl compound is of Formula (I):

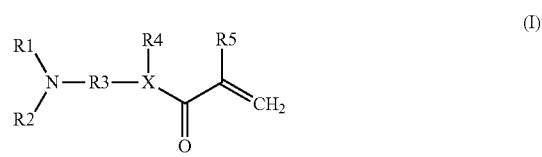

wherein R1 is hydrogen, alkyl, or aralkyl; R2 is alkyl or aralkyl; or R1 and R2 together with the nitrogen atom with which they are joined may form a 5, 6, or 7 member ring; R3 is alkylene or aralkylene; X is nitrogen or oxygen; R4 does not exist if X is oxygen and is hydrogen, alkyl, aryl, alkaryl, or aralkyl if X is nitrogen; and R5 is hydrogen or methyl;

wherein the amine-functional (meth)acryloyl compound is of Formula (II):

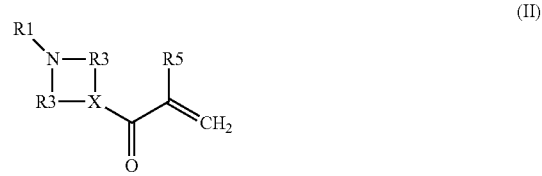

wherein R1 is hydrogen, alkyl, or aralkyl; each R3 is independently alkylene or aralkylene; X is nitrogen; and R5 is hydrogen or methyl; or combinations thereof.

In some embodiments, the amine-functional (meth)acrylic resin has a calculated glass transition temperature (Tg) greater than or equal to 12° C. In some embodiments, the amine-functional (meth)acrylic resin has a calculated Tg greater than or equal to 20° C. In some embodiments, the non-amine-vinyl monomer is selected from the group consisting of a (meth)acrylic acid, a (meth)acrylic acid ester, a (meth)acrylamide, a vinyl ester, a styrene, a (meth)acrylonitrile, and mixtures thereof. In some embodiments, the non-amine-vinyl monomer is a (meth)acrylic acid ester of a C1 to C18 alcohol.

In some embodiments, the rubber comprises a block copolymer of a styrene and an alkene. In some embodiments, the rubber comprises a styrene-ethylene/butylene-styrene block copolymer grafted with maleic anhydride.

In some embodiments, the plasticizer is of Formula III:

wherein: each R may be hydrogen, C1-C14 alkyl, aryl, alkaryl, or aralkyl; each optionally interrupted by oxygen, nitrogen, carbonyl, carboxyl, or carbamide; each X may be oxygen, nitrogen, carbonyl, carboxyl, or carbamide; Z may be a hydrogen, C1-C14 alkyl, aryl, alkaryl, aralkyl, C1-C14 alkylene, arylene, alkarylene, aralkylene; each optionally interrupted by oxygen, nitrogen, carbonyl, carboxyl, or carbamide; and n is an integer of 1 to 5. In some embodiments, n is an integer of 1 to 4.

In some embodiments, the plasticizer is selected from at least one of the following; a benzoic acid ester, a myristic acid ester, a citric acid ester, an acetic acid ester, a succinic acid ester, a gluratic acid ester, an adipic acid ester, a sebacic acid ester, and combinations thereof. In some embodiments, the plasticizer is selected from at least one of the following; a benzoic acid ester, a myristic acid ester, a citric acid ester, and combinations thereof. A citric acid ester may have one, two, three, or four R groups as referenced in Formula III.

In some embodiments, the primer component comprises: 35 wt. % to 70 wt. % of the rubber; 20 wt. % to 35 wt. % of the amine-functional (meth)acrylic resin; and 10 wt. % to 40 wt. % of the plasticizer, wherein the weight percentages are all based on the total weight of the primer component. In some embodiments, the primer component comprises: 40 wt. % to 60 wt. % of the rubber; 20 wt. % to 35 wt. % of the amine-functional (meth)acrylic resin; and 15 wt. % to 35 wt. % of the plasticizer, wherein the weight percentages are all based on the total weight of the primer component.

In some embodiments, the primer composition further comprises a liquid carrier. In some embodiments, the liquid carrier is a solvent. In some embodiments, the primer composition comprises: 1 wt. % to 25 wt. % of the primer component; and 75 wt. % to 99 wt. % of the solvent, wherein the weight percentages are all based on the total weight of the primer composition. In some embodiments, the primer composition comprises: 2 wt. % to 7 wt. % of the primer component; and 93 wt. % to 98 wt. % of the solvent, wherein the weight percentages are all based on the total weight of the primer composition.

In some embodiments, the solvent is a solvent blend having a Hildebrand total solubility parameter in a range from about 15 $MPa^{1/2}$ to about 17.5 $MPa^{1/2}$. In some embodiments, the plasticizer has a Predicted Enthalpy of Evaporation greater than about 50 kJ/mol. In some embodiments, the plasticizer has a Predicted Enthalpy of Evaporation greater than about 55 kJ/mol.

In another aspect, the present disclosure provides an article comprising: a substrate; and a layer of any of the aforementioned primer components disposed on at least one outer surface of the substrate. In some embodiments, the article further comprises a layer of adhesive disposed on the layer of the primer component opposite the substrate. In some embodiments, the article further comprises a backing layer disposed on the layer of adhesive opposite the layer of any of the aforementioned primer component.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

Primer compositions of the present disclosure are conveniently applied in liquid form, for example from the melt; as aqueous emulsions, dispersions, or suspensions; or, preferably, as solvent solutions. Preferred solvent solutions are homogeneous and storage stable and minimally attack substrate during use. Solvent solutions may comprise a single solvent or a blend of solvents.

As used herein, a primer surface preparation, derived from the presently disclosed primer composition comprising non-volatile primer component, is considered to provide strong adhesion to double sided tapes, such as for example, double sided foam tapes, when there is a peel adhesion of at least 35 Newtons per centimeter (N/cm) (20 pounds per inch width (piw)) between two bonded substrates, preferably peel adhesion exceeding 52 N/cm (30 piw) between two bonded substrates, and more preferably peel adhesion exceeding 52 N/cm (30 piw) between two bonded substrates and resulting in cohesive failure in the tape.

The present disclosure provides a primer composition having a primer component comprising a rubber, an amine-functional (meth)acrylic resin, and a plasticizer. In some embodiments, the present disclosed primer composition comprises a rubber, an amine-functional (meth)acrylic resin, a plasticizer, and an aliphatic hydrocarbon.

Rubbers useful in the present disclosure include block copolymers of styrene and alkene, preferably hydrogenated styrene/alkene block copolymers, and more preferably hydrogenated styrene/alkene block copolymers further bearing pendant anhydride moieties. Most preferably, the rubber is a styrene-ethylene/butylene-styrene block copolymer grafted with maleic anhydride, such as those available under the trade designation "KRATON FG1901" from Kraton Performance Polymers Inc., Houston, Tex.

Amine-functional acrylic resins useful in the present disclosure include those derivable by copolymerization of amine-functional (meth)acrylic acid esters and amides with non-amine-functional vinyl monomers. Amine-functional acrylic acid esters and amides are selected from those of Formula (I)

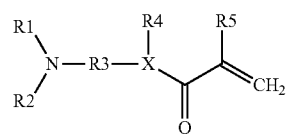

wherein R1 is hydrogen, alkyl, or aralkyl; R2 is alkyl or aralkyl; or R1 and R2 together with the nitrogen atom with which they are joined may form a 5, 6, or 7 member ring; R3 is alkylene or aralkylene; X is nitrogen or oxygen; R4 does not exist if X is oxygen and is hydrogen, alkyl, aryl, alkaryl, or aralkyl if X is nitrogen; and R5 is hydrogen or methyl;

and those of Formula (II)

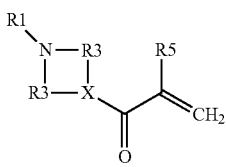

wherein R1 is hydrogen, alkyl, or aralkyl; each R3 is independently alkylene or aralkylene; X is nitrogen; and R5 is hydrogen or methyl.

Preferred amine-functional (meth)acrylic acid esters and amides include 2-(N,N-dimethylaminoethyl) (meth)acrylate; 2-(N,N-diethylaminoethyl) (meth)acrylate; 2-(t-butylaminoethyl) (meth)acrylate; 2-(N,N-dimethylaminoethyl) (meth)acrylamide; 2-(N,N-diethylaminoethyl) (meth)acrylamide; 2-(t-butylaminoethyl) (meth)acrylamide; and N-(meth)acryloylpiperidine. 2-(N,N-dimethylaminoethyl) methacrylate and 2-(t-butylaminoethyl) methacrylate are particularly preferred.

In some embodiments, the amine-functional (meth) acrylic resin has a calculated Tg greater than or equal to 12° C. In some embodiments, the amine-functional (meth) acrylic resin has a calculated Tg greater than or equal to 20° C. The calculated Tg of an amine-functional (meth)acrylic resin can be conveniently estimated according to Formula V $$Tg_{amine\text{-}functional\ (meth)acrylic\ resin} = 1/(\Sigma(W_i/(Tg_i+273)))-273$$

wherein $Tg_{amine\text{-}functional\ (meth)acrylic\ resin}$ is the calculated Tg for the amine-functional (meth)acrylic resin and $W_i$ and $Tg_i$ are weight fraction and homopolymer Tg for individual amine-functional (meth)acrylic acid esters and amides and non-amine-functional vinyl monomers present in the amine-functional (meth)acrylic resin. Each Tg has units in degrees Celsius. Values for homopolymer Tg for individual amine-functional (meth)acrylic acid esters and amides and non-amine-functional vinyl monomers are conveniently tabulated, for example, in *Polymer Handbook, 2nd edition*. John Wiley, 1975.

Non-amine-functional vinyl monomers include, for example, (meth)acrylic acid and their esters and amides, vinyl esters, styrene, and (meth)acrylonitrile. (meth)acrylic acid esters are preferred non-amine-functional vinyl monomers. More preferred (meth)acrylic acid esters are formally esters of (meth)acrylic acid with C1 to C18 alcohols.

Plasticizers useful in the present disclosure remain in the primer coating after evaporation of a liquid carrier, for example, a solvent, and minimize attack (e.g. dissolution, crazing, marring, discoloration) on a substrate used therewith. Preferred plasticizers have Predicted Enthalpies of Evaporation greater than about 50 kJ/mol and general structure of Formula III (R—X—)$_n$Z wherein each R may be hydrogen, C1-C14 alkyl, aryl, alkaryl, or aralkyl; each optionally interrupted by oxygen, nitrogen, carbonyl, carboxyl, or carbamide;

each X may be oxygen, nitrogen, carbonyl, carboxyl, or carbamide;

each Z may be a hydrogen, C1-C14 alkyl, aryl, alkaryl, aralkyl, C1-C14 alkylene, arylene, alkarylene, aralkylene; each optionally interrupted by oxygen, nitrogen, carbonyl, carboxyl, or carbamide; and n is an integer ranging from 1 to 5, or in some embodiments, n is an integer ranging from 1 to 4.

Preferred plasticizers include benzoic acid ester, myristic acid ester, citric acid ester, acetic acid ester, succinic acid ester, gluratic acid ester, adipic acid ester, and sebacic acid ester, and combinations thereof. More preferred plasticizers include benzoic acid ester, myristic acid ester, and citric acid ester.

Plasticizers useful in the present disclosure preferably resist evaporation and remain in the primer component for prolonged periods. While volatile plasticizers can be useful, for example, when a priming step immediately precedes a tape bonding step, preferred plasticizers remain in the primer component even when the tape bonding step is delayed. Useful plasticizers preferably retain efficacy for at least three minutes after application, more preferably for at least 60 minutes, most preferably for at least 24 hours. Resistance to evaporation can be conveniently quantified according to the predicted enthalpy of vaporization values provided by commercially available chemical computation software, such as that available under the name "Percepta Predictors—Software Modules to Predict Physicochemical, ADME, and Toxicity Properties" from Structure Advanced Chemistry Development (publicly available by accessing the website called http.//www.chemspider.com (last accessed on Nov. 20, 2015). Preferred plasticizers useful in the present disclosure have predicted enthalpies of vaporization greater than about 50 kJ/mol, and more preferably greater than about 55 kJ/mol. Predicted enthalpy of vaporization for plasticizers useful in the present disclosure are listed in the table below:

| Compound | Predicted Enthalpy of Vaporization (kJ/mol) |
|---|---|
| tributyl acetylcitrate | 89 |
| tributyl citrate | 74 |
| dipropylene glycol dibenzoate | 73 |
| diethylene glycol dibenzoate | 66 |
| propylene glycol dicaprate/caprylate | 65 |
| dibutyl tartarate | 65 |
| triethyl citrate | 62 |
| diethyl tartarate | 60 |
| diethyl malate | 60 |
| isodecyl benzoate | 59 |
| dibutyl phthalate | 58 |
| triethyl acetylcitrate | 57 |
| isopropyl myristate | 56 |
| diethyl sebacate | 55 |
| ethyl toluenesulfonamide | 55 |
| ethylhexyl benzoate | 55 |
| dibutyl itaconate | 55 |
| dibutyl adipate | 54 |
| dimethyl sebacate | 54 |
| dibutyl fumarate | 52 |
| tributyl phosphate | 51 |
| phenoxypropanol | 51 |
| glycerol triacetate | 50 |
| butyl lactate | 49 |
| dimethyl adipate | 47 |
| diethyl succinate | 46 |

In some embodiments, the present disclosure provides a primer composition having a primer component comprising a rubber, an amine-functional (meth)acrylic resin, a plasticizer, and a liquid carrier. In some embodiments, the present disclosed primer composition comprises a rubber, an amine-functional (meth)acrylic resin, a plasticizer, and an aliphatic hydrocarbon. Preferred liquid carrier useful in the present disclosure is solvent.

In some embodiments, the presently disclosed primer composition comprises: 1 wt. % to 25 wt. % of the primer component; and 75 wt. % to 99 wt. % of the solvent, where the weight percentages are all based on the total weight of the primer composition. In some embodiments, the presently disclosed primer composition comprises: 2 wt. % to 7 wt. % of the primer component; and 93 wt. % to 98 wt. % of the solvent, where the weight percentages are all based on the total weight of the primer composition.

Solvent solutions useful in the present disclosure are those having a Hildebrand total solubility parameter between about 15 MPa$^{1/2}$ and about 17.5 MPa$^{1/2}$. Hildebrand total solubility parameters for single solvents are conveniently tabulated, for example, in *Handbook of Solubility Parameters and Other Cohesion Parameters*, 2nd edition. CRC Press, 1991. Hildebrand total solubility parameters for solvent blends can be estimated from the volume averaged Hildebrand total solubility parameters of the individual solvent components in the solvent blend according to Formula IV $$SP_{blend} = \Sigma(W_i/SG_i \times SP_i)/\Sigma(W_i/SG_i)$$

wherein $SP_{blend}$ is the Hildebrand total solubility parameter of the solvent blend and $W_i$, $SG_i$, and $SP_i$ are weight fraction, specific gravity, and Hildebrand total solubility parameter for each individual solvent in the blend. Representative Hildebrand total solubility parameter and specific gravity for select individual solvents and various solvent blends follow.

| Individual Solvent | $SP_i$ (MPa$^{1/2}$) | $SG_i$ (g/ml) |
|---|---|---|
| hexamethyldisiloxane (HMDS) | 11.7 | 0.77 |
| heptane | 15.3 | 0.68 |
| methylcyclohexane (MCH) | 16.0 | 0.77 |
| t-butyl acetate (tBAC) | 16.2 | 0.87 |
| methyl acetate (MAC) | 19.4 | 0.94 |
| acetone | 19.7 | 0.79 |

| Solvent Blend | Estimated $SP_{blend}$ (MPa$^{1/2}$) |
|---|---|
| 40/40/20 MCH/MAC/HMDS | 16.3 |
| 30/40/30 MCH/MAC/HMDS | 15.8 |
| 60/40 heptane/MAC | 16.6 |
| 40/40/20 heptane/MAC/tBAC | 16.9 |
| 46/15/39 heptane/MCH/MAC | 16.7 |

Individual solvents preferably useful in the present disclosure include acetone, methyl acetate, t-butyl acetate, hexamethyldisiloxane, heptane, and methylcyclohexane.

More preferred solvent solutions for use in the present disclosure comprise less than 0.1 wt. % of any one aromatic hydrocarbon including, for example, benzene, toluene, xylene, ethylbenzene, and chlorobenzene. Even more preferred solvent solutions comprise less than 0.1 wt. % total aromatic hydrocarbon. Most preferably, the solvent solution comprises less than 0.01 wt. % total aromatic hydrocarbon.

More preferred solvent solutions comprise, for example 0-50 wt. % acetone, 0-50 wt. % methyl acetate, 0-40 wt. % hexamethyldisiloxane, and 0-40 wt. % t-butyl acetate. More preferred solvent solutions additionally comprise 25-90 wt. % aliphatic alkane, including straight chain, branched, and cyclic hydrocarbons, especially those having five to twelve carbon atoms. Heptane and methylcyclohexane are especially preferred aliphatic alkanes. More preferred solvent solutions comprise 25-45 wt. % acetone or methyl acetate, 0-25 wt. % hexamethyldisiloxane, and 35-75 wt. % aliphatic alkane. Most preferred solvent solutions comprise methyl acetate and methylcyclohexane or methyl acetate and heptane.

Preferred primer compositions of the present disclosure comprise 92 to 99 wt. % volatile solvents and 1 to 8 wt. % non-volatile primer components, more preferably 94 to 97 wt. % volatile solvents and 3 to 6 wt. % non-volatile primer components.

In some embodiments, the presently disclosed primer composition comprises a primer component, where the primer component comprises: 35 wt. % to 70 wt. % of the rubber; 20 wt. % to 35 wt. % of the amine-functional (meth)acrylic resin; and 10 wt. % to 40 wt. % of the plasticizer, where the weight percentages are all based on the total weight of the primer component. In some embodiments, the presently disclosed primer composition comprises a primer component, where the primer component comprises: 40 wt. % to 60 wt. % of the rubber; 20 wt. % to 35 wt. % of the amine-functional (meth)acrylic resin; and 15 wt. % to 35 wt. % of the plasticizer, where the weight percentages are all based on the total weight of the primer component.

In some embodiments, the primer composition further comprises a colorant. In some embodiments, the colorant is fluorescent.

The present disclosure provides primer compositions comprising primer component that exhibit good adhesion to both low energy surfaces (e.g., polyolefins, such as polypropylene), as well as higher energy surfaces (i.e., having surface energies greater than 35 dynes/cm such as metal). The primer compositions are useful as primers (e.g., for use with adhesives, paints, and coatings).

In some embodiments, articles can be made comprising: a substrate; and a primer surface treatment of any of the previously disclosed embodiments of the primer component disposed on at least one surface of the substrate. These articles can also include a layer of adhesive disposed on the layer of the primer surface treatment opposite the substrate. In some embodiments, these articles can also include a backing layer disposed on the layer of adhesive opposite the layer of the primer surface treatment.

Following are non-limiting, exemplary embodiments and combinations of embodiments for the present disclosure:

Embodiment 1. A primer composition comprising a primer component comprising: a rubber; an amine-functional (meth)acrylic resin; and a plasticizer.

Embodiment 2. The primer composition of Embodiment 1, wherein the amine-functional (meth)acrylic resin is a polymerization reaction product of an amine-functional (meth)acryloyl compound and a non-amine-vinyl monomer; wherein the amine-functional (meth)acryloyl compound is of Formula (I):

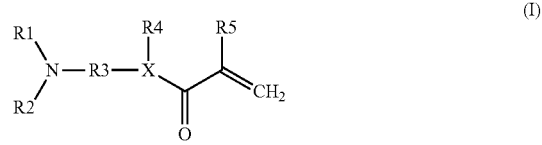

wherein R1 is hydrogen, alkyl, or aralkyl; R2 is alkyl or aralkyl; or R1 and R2 together with the nitrogen atom with which they are joined may form a 5, 6, or 7 member ring; R3 is alkylene or aralkylene; X is nitrogen or oxygen; R4 does not exist if X is oxygen and is hydrogen, alkyl, aryl, alkaryl, or aralkyl if X is nitrogen; and R5 is hydrogen or methyl;

wherein the amine-functional (meth)acryloyl compound is of Formula (II):

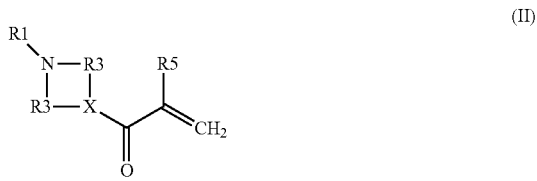

(II)

wherein R1 is hydrogen, alkyl, or aralkyl; each R3 is independently alkylene or aralkylene; X is nitrogen; and R5 is hydrogen or methyl; or combinations thereof.

Embodiment 3. The primer composition of Embodiment 1 or 2, wherein the amine-functional (meth)acrylic resin has a calculated Tg greater than or equal to 12° C.

Embodiment 4. The primer composition of Embodiment 2, wherein the non-amine-vinyl monomer is selected from the group consisting of a (meth)acrylic acid, a (meth)acrylic acid ester, a (meth)acrylamide, a vinyl ester, a styrene, a (meth)acrylonitrile, and mixtures thereof.

Embodiment 5. The primer composition of any of Embodiments 2, 3 or 4, wherein the non-amine-vinyl monomer is a (meth)acrylic acid ester of a C1 to C18 alcohol.

Embodiment 6. The primer composition of any of the preceding Embodiments, wherein the rubber comprises a block copolymer of a styrene and an alkene.

Embodiment 7. The primer composition of any of the preceding Embodiments, wherein the rubber comprises a styrene-ethylene/butylene-styrene block copolymer grafted with maleic anhydride.

Embodiment 8. The primer composition of any of the preceding Embodiments, wherein the plasticizer is of Formula III:

(III)

wherein: each R may be hydrogen, C1-C14 alkyl, aryl, alkaryl, or aralkyl; each optionally interrupted by oxygen, nitrogen, carbonyl, carboxyl, or carbamide; each X may be oxygen, nitrogen, carbonyl, carboxyl, or carbamide; Z may be a hydrogen, C1-C14 alkyl, aryl, alkaryl, aralkyl, C1-C14 alkylene, arylene, alkarylene, aralkylene; each optionally interrupted by oxygen, nitrogen, carbonyl, carboxyl, or carbamide; and n is an integer of 1 to 5.

Embodiment 9. The primer composition of Embodiment 8, wherein n is an integer of 1 to 4.

Embodiment 10. The primer composition of any of the preceding Embodiments, wherein the plasticizer is selected from at least one of the following a benzoic acid ester, a myristic acid ester, a citric acid ester, an acetic acid ester, a succinic acid ester, a gluratic acid ester, an adipic acid ester, a sebacic acid ester, and combinations thereof.

Embodiment 11. The primer composition of any Embodiments 1 to 9, wherein the plasticizer is selected from at least one of the following a benzoic acid ester, a myristic acid ester, a citric acid ester, and combinations thereof.

Embodiment 12. The primer composition of any of the preceding Embodiments, wherein the primer component comprises: 35 wt. % to 70 wt. % of the rubber; 20 wt. % to 35 wt. % of the amine-functional (meth)acrylic resin; and 10 wt. % to 40 wt. % of the plasticizer, wherein the weight percentages are all based on the total weight of the primer component.

Embodiment 13. The primer composition of any of Embodiments 1 to 11 wherein the primer component comprises: 40 wt. % to 60 wt. % of the rubber; 20 wt. % to 35 wt. % of the amine-functional (meth)acrylic resin; and 15 wt. % to 35 wt. % of the plasticizer, wherein the weight percentages are all based on the total weight of the primer component.

Embodiment 14. The primer composition of any of the preceding Embodiments further comprising a liquid carrier.

Embodiment 15. The primer composition of Embodiment 14 wherein the liquid carrier is a solvent.

Embodiment 16. The primer composition of Embodiment 15, wherein the primer composition comprises: 1 wt. % to 25 wt. % of the primer component; and 75 wt. % to 99 wt. % of the solvent, wherein the weight percentages are all based on the total weight of the primer composition.

Embodiment 17. The primer of Embodiment 15, wherein the primer composition comprises: 2 wt. % to 7 wt. % of the primer component; and 93 wt. % to 98 wt. % of the solvent, wherein the weight percentages are all based on the total weight of the primer composition.

Embodiment 18. The primer composition of any of Embodiments 15 to 17 wherein the solvent is a solvent blend having a Hildebrand total solubility parameter in a range from about 15 MPa$^{1/2}$ to about 17.5 MPa$^{1/2}$.

Embodiment 19. The primer composition of any of the preceding Embodiments wherein the plasticizer has a Predicted Enthalpy of Evaporation greater than about 50 kJ/mol.

Embodiment 20. The primer composition of Embodiment 1 or 2, wherein the amine-functional (meth)acrylic resin has a calculated Tg greater than or equal to 20° C.

Embodiment 21. The primer composition of any of the preceding Embodiments wherein the plasticizer has a Predicted Enthalpy of Evaporation greater than about 55 kJ/mol.

Embodiment 22. An article comprising: a substrate; and a layer of any of the aforementioned primer components disposed on at least one outer surface of the substrate.

Embodiment 23. The article of Embodiment 22 further comprising a layer of adhesive disposed on the layer of any of the aforementioned primer components opposite the substrate.

Embodiment 24. The article of Embodiment 23 further comprising a backing layer disposed on the layer of adhesive opposite the layer of the primer component.

Various modifications and alterations of this invention will become apparent to those skilled in the art without departing from the scope and spirit of this invention.

EXAMPLES

TABLE 1

Materials

| Designation | Description | Source |
|---|---|---|
| MMA | methyl methacrylate | Dow Chemical, Midland, MI |
| IOA | iso-octyl acrylate | 3M Co., St. Paul, MN |
| tBAEMA | 2-(t-butylamino)ethyl methacrylate | BASF, Florham Park, NJ |
| MAC | Methyl acetate | Alfa-Aesar, Ward Hill, MA |
| VAZO | 2,2'-azobis(2-methylbutyronitrile) | DuPont, Wilmington, DE |
| NVC | N-vinylcaprolactam | BASF, Florham Park, NJ |
| KRATON FG1901 | a clear, linear triblock copolymer based on styrene and ethylene/butylene | Kraton Polymers, Houston, TX |
| TINOPAL OB | 2,5-thiophenediylbis(5-tert-butyl-1,3-benzoxazole | BASF, Florham Park, NJ |
| ATBC | tributyl acetylcitrate | Lanxess, Orange, TX |
| A186 | 2-(3,4-epoxycyclohexyl)ethyltrimethoxysilane | Momentive, Columbus, OH |
| MCH | methylcyclohexane | Alfa-Aesar, Ward Hill, MA |
| HMDS | hexamethyldisiloxane | Alfa-Aesar, Ward Hill, MA |
| AA | Acrylic acid | Dow Chemical, Midland, MI |

Test Methods

Polymer Inherent Viscosity

The inherent viscosity was determined by conventional means using a Cannon-Fenske #50 viscometer in a 25° C. water bath to measure the flow time of 10 milliliters polymer solution (0.60 grams per deciliter of ethyl acetate.)

sive failure within the foam tape during testing, "cp" means the tape peeled cleanly from the surface and the tape did not fail cohesively during testing, and "mix" indicates a mixture of fs and cp failure modes were observed during testing. A list of adhesion performance test substrates immediately follows:

| Adhesion Performance Test Substrates | | |
|---|---|---|
| Designation | Description | Source |
| stainless steel | Polished stainless steel | ChemInstruments, Fairfield, OH |
| acrylic | Acrylic Clear, Ext PE Mask, 0.118" thick | Plastics International, Eden Prairie, MN |
| polycarbonate | MAKROLON GP, clear, 0.118" thick | Plastics International |
| ABS | ABS Natural (Tan) S/S Ext, 0.125" thick | Plastics International |
| Nylon | Nylon Type 6/6 Natural, 0.125" thick | Plastics International |
| Rigid PVC | Type 1 Grade 1 Gray PVC, 0.125" thick | Plastics International |
| polyester FRP | GPO-3 Polyester/Glass red, 0.125" thick, glass fiber reinforced polyester | Plastics International |
| Epoxy FRP | FR4 Epoxy/Glass, 0.125" thick, glass fiber reinforced thermoset epoxy resin | Plastics International |
| phenolic | CE Phenolic/Canvas Natural, 0.125" thick, canvas reinforced phenolic | Plastics International |
| TPO | BASEL HIFAX ETA 3131 BLK thermoplastic polyolefin | Standard Plaque, Melvindale, MI |
| polypropylene | Polypropylene SR Natural, 0.125" thick | Plastics International |
| white truck paint | DC105W-2196 19G1393 POLAR WHITE, roll-coated, heat-cured, wax-containing coating (0.75 mil thick) on 0.019" thick aluminum | Dura Coat Products, Huntsville, AL |

Primer Component Adhesion Performance ("Peel Test")

Substrates were cleaned with SURPASS facial tissues (Kimberly-Clark) wetted with aqueous isopropyl alcohol (50:50 vol/vol) then allowed to dry. The Primer Composition was poured onto a fresh SURPASS facial tissue, applied to substrates in even coats, and allowed to dry for three minutes. 3M™ VHB™ TAPE 4611 tape strips (1 inch×4 inches, ~2.5 cm×~10 cm) were backed on one face with anodized aluminum foil and the other face was placed onto the primed surface, then pressed down twice under a 15 pound (6.8 kg) roller moving at 12 inches (~30 cm) per minute. 90° peel strengths were assessed after standing overnight at room temperature, pulling the anodized aluminum foil backing perpendicular to the substrate at 12 inches (~30 cm) per minute. The average peel force was recorded along with failure mode. Failure mode "fs" indicates cohe- Preparative Example 1 (PE-1)

Preparation of Amine-Functional Acrylic Resin 1 (AFAR1) (55:30:15 MMA/IOA/tBAEMA, at 40 wt. % Solids in MAC)

A reactor was charged with 132 grams MMA, 72 grams IOA, 36 grams of tBAEMA, 360 grams of MAC, and 1.92 grams of VAZO 67. The solution was deoxygenated with nitrogen, the reactor was sealed, and the solution was heated 46 hours at 65° C., then allowed to cool. The resulting solution was found to contain 40.3 wt. % solids and had inherent viscosity of 0.36.

Preparative Examples 2 to 9 (PE-2 to PE-9)

Amine-Functional Acrylic Resins 2 to 9 (AFAR2-AFAR9)

The general procedure for preparation of PE-1 was repeated (with the same relative amounts of MAC and VAZO 67), but altering monomer weight ratios and/or incorporating alternative monomers, according to the amounts indicated in Table 2, with the resulting inherent viscosity and wt. % solid ("phr" is per hundred weight resin) values listed.

TABLE 2

| Preparative Example | "AFAR" number | MMA, phr | BMA, phr | IOA, phr | tBAEMA, phr | DMAEMA, phr | Calculated Tg | Inherent viscosity | Wt. % solids |
|---|---|---|---|---|---|---|---|---|---|
| PE-1 | AFAR1 | 55 | 0 | 30 | 15 | 0 | 26° C. | 0.36 | 40.3 |
| PE-2 | AFAR2 | 42 | 0 | 42 | 16 | 0 | 6° C. | 0.38 | 40.1 |
| PE-3 | AFAR3 | 35 | 53 | 0 | 12 | 0 | 49° C. | 0.42 | 34.2 |
| PE-4 | AFAR4 | 35 | 53 | 0 | 0 | 12 | 47° C. | 0.37 | 34.9 |
| PE-5 | AFAR5 | 42 | 42 | 0 | 16 | 0 | 55° C. | 0.33 | 40.6 |
| PE-6 | AFAR6 | 56 | 14 | 14 | 16 | 0 | 47° C. | 0.35 | 40.4 |
| PE-7 | AFAR7 | 28 | 28 | 28 | 16 | 0 | 12° C. | 0.37 | 40.1 |
| PE-8 | AFAR8 | 0 | 42 | 42 | 16 | 0 | −16° C. | 0.38 | 39.9 |
| PE-9 | AFAR9 | 14 | 14 | 56 | 16 | 0 | −21° C. | 0.39 | 39.8 |

Preparative Examples 10 (PE-10)

Amide-Functional Acrylic Resin ("AMDA")

The general procedure for preparation of PE-1 was repeated, but replacing amino-functional monomer with amide-functional monomer, N-vinylcaprolactam (NVC), and using the monomer weight ratios, according to the amounts indicated in Table 3.

TABLE 3

| Preparative Example | IOA, phr | NVC, phr | AA, phr | Inherent viscosity | Wt. % solids |
|---|---|---|---|---|---|
| PE-10 (AMDA) | 78 | 21 | 1 | 0.58 | 37.5 |

Example 1

Primer Composition: (50:24:24:2 KRATON FG1901/ATBC/PE-1/A186 in Solvent Solution)

A 5-liter flask equipped with overhead stirring, thermocouple, condenser, and nitrogen inlet was charged with 100.0 grams KRATON FG1901, 3.0 grams TINOPAL OB, 48.0 grams ATBC, and 4.0 grams A186. Stirring was started, 567 grams of MCH was added, and the mixture was heated 3 hours at 60° C. to ensure homogeneous solution. The solution was diluted with an additional 953 grams MCH, cooled to ambient temperature, then sequentially diluted with 1448 grams of methyl acetate, 120 grams of the AFAR of PE-1, and 760 grams HMDS. The final solution was found to have 4.7 wt. % solids.

Example 1 Primer Composition was applied to various substrates and performance of the dried coatings were assessed according to the Primer Component Adhesion Performance test method. Peel forces and failure modes were as recorded in Table 4.

TABLE 4

| | Example 1 primer composition peel force test results | |
|---|---|---|
| Substrate | piw (N/cm) | failure mode |
| stainless steel | 46 (80) | fs |
| acrylic | 46 (80) | fs |
| polycarbonate | 46 (80) | fs |

TABLE 4-continued

| | Example 1 primer composition peel force test results | |
|---|---|---|
| Substrate | piw (N/cm) | failure mode |
| ABS | 46 (80) | fs |
| Nylon | 47 (82) | mix |
| Rigid PVC | 46 (80) | fs |
| polyester FRP | 43 (75) | mix |
| Epoxy FRP | 46 (80) | fs |
| phenolic | 46 (80) | fs |
| TPO | 45 (78) | fs |
| polypropylene | 27 (47) | mix |
| white truck paint | 36 (63) | cp | piw: pounds force per inch width

N/cm: Newtons/cm mode: fs = foam split mix = mixed mode cp = clean peel

Examples 2-5

Example 1 was repeated, preserving the 50/24/24/2 KRATON FG1901/AFAR/ATBC/A186 ratio, but replacing AFAR1 with AFAR2, omitting TINOPAL OB, and varying concentration of total solids as shown in Table 5. The peel force test results were as shown in Table 5.

TABLE 5

| Substrate | Example 2 3 wt. % solids piw (N/cm) | mode | Example 3 4 wt. % solids piw (N/cm) | mode | Example 4 5 wt. % solids piw (N/cm) | mode | Example 5 6 wt. % solids piw (N/cm) | mode |
|---|---|---|---|---|---|---|---|---|
| Nylon | 32 (56) | cp | 32 (56) | cp | 34 (59) | cp | 34 (59) | cp |
| polypropylene | 32 (56) | mix | 36 (63) | mix | 19 (33) | mix | 28 (49) | mix |
| white truck paint | 28 (49) | cp | 32 (56) | cp | 33 (57) | cp | 31 (54) | cp |

Examples 6-7 and Comparative Example 1

Example 3 was repeated, except replacing AFAR2 with AMDA, AFAR3, AFAR4, or a mixture thereof, and adjusting the non-volatile ingredient ratio as shown in Table 6. The peel force test results were as shown in Table 6.

TABLE 6

| Example | Non-volatiles, weight ratio | polypropylene piw (N/cm) | mode | phenolic piw (N/cm) | mode |
|---|---|---|---|---|---|
| Example 6 | 50/7/15/26/2 KRATON FG1901/AMDA/AFAR3/ATBC/A186 | 35 (61) | fs | 35 (61) | fs |
| Example 7 | 50/7/15/26/2 KRATON FG1901/AMDA/AFAR4/ATBC/A186 | 35 (61) | fs | 35 (61) | fs |
| Comparative 1 | 50/20/28/2 KRATON FG1901/AMDA/ATBC/A186 | 18 (31) | cp | 19 (33) | cp |

Examples 8-16 and Comparative Examples 2-3

Example 4 was repeated, except replacing ATBC with alternative plasticizer, or omitting plasticizer, with peel force test results as shown in Table 7.

TABLE 7

| Example | Plasticizer | Nylon piw (N/cm) | mode | polypropylene piw (N/cm) | mode | white truck paint piw (N/cm) | mode |
|---|---|---|---|---|---|---|---|
| Example 8 | isopropyl myristate | 38 (66) | mix | 40 (70) | fs | 32 (56) | cp |
| Example 9 | dibutyl adipate | 36 (63) | cp | 43 (75) | fs | 30 (52) | cp |
| Example 10 | phenoxypropanol | 32 (56) | cp | 31 (54) | mix | 38 (66) | cp |
| Example 11 | isodecyl benzoate | 32 (56) | cp | 26 (45) | cp | 37 (64) | mix |
| Example 12 | dipropylene glycol dibenzoate | 42 (73) | mix | 21 (36) | cp | 39 (68) | mix |
| Example 13 | diethylene glycol dibenzoate/dipropylene glycol dibenzoate | 32 (56) | cp | 32 (56) | mix | 38 (66) | mix |
| Example 14 | 2,2,4-trimethylpentyl dibenzoate | 41 (71) | cp | 19 (33) | cp | 40 (70) | mix |
| Example 15 | triethylene glycol diethylhexanoate | 32 (56) | cp | 21 (36) | cp | 31 (54) | cp |
| Example 16 | diethylhexyl terephthalate | 32 (56) | cp | 32 (56) | cp | 29 (50) | cp |
| Comparative 2 | none | 42 (73) | mix | 14 (24) | cp | 26 (45) | cp |
| Comparative 3 | 2-octyldodecanol | 31 (54) | cp | 16 (28) | cp | 30 (52) | cp |

Examples 17-24 and Comparative Examples 4-9

Example 3 was repeated, all at 4 wt. % solids, but replacing AFAR2 with AFAR3 and varying KRATON FG1901/AFAR3/ATBC weight ratio, with peel force test results as shown in Table 8.

TABLE 8

| Example | Non-volatiles, weight ratio KRATON FG1901/AFAR3/ATBC | Nylon piw (N/cm) | mode | polypropylene piw (N/cm) | mode | white truck paint piw (N/cm) | mode |
|---|---|---|---|---|---|---|---|
| Example 17 | 48/32/20 | 36.8 (64) | mix | 37.5 (65) | mix | 39.5 (69) | mix |
| Example 18 | 40/24/36 | 33.3 (58) | mix | 39 (68) | mix | 28.7 (50) | cp |
| Example 19 | 64/24/12 | 29.4 (51) | cp | 25.1 (44) | cp | 24.9 (43) | cp |
| Example 20 | 64/10/26 | 25.6 (44) | cp | 24.7 (43) | mix | 22.1 (38) | cp |
| Example 21 | 48/24/28 | 31.6 (55) | cp | 36 (63) | mix | 26.3 (46) | cp |
| Example 22 | 40/32/28 | 29.5 (51) | cp | 27.6 (48) | mix | 28.1 (49) | cp |
| Example 23 | 48/16/36 | 29.2 (51) | cp | 24 (42) | cp | 23.7 (41) | cp |
| Example 24 | 5624/20 | 32.8 (57) | cp | 29.1 (51) | mix | 24.4 (42) | cp |
| Comparative 4 | 32/40/28 | 25.6 (44) | cp | 10.8 (18) | cp | 20.2 (35) | cp |
| Comparative 5 | 5517/28 | 35.8 (62) | mix | 16.4 (28) | cp | 28.7 (50) | cp |
| Comparative 6 | 40/48/12 | 24.8 (43) | cp | 13.9 (24) | cp | 18.4 (32) | cp |
| Comparative 7 | 55/40/5 | 28.1 (49) | cp | 18.5 (32) | cp | 16.9 (29) | cp |
| Comparative 8 | 32/24/44 | 33.1 (58) | cp | 16.5 (28) | cp | 16.7 (29) | cp |
| Comparative 9 | 48/10/42 | 28.2 (49) | cp | 18.4 (32) | mix | 25.3 (44) | cp |

Example 25

Example 4 was repeated, except replacing the 40/40/20 MCH/MAC/HMDS solvent blend with the solvent blend indicated in Table 9.

TABLE 9

| Example | Solvent Blend Weight Ratio MCH | MAC | HMDS | Nylon piw (N/cm) | mode | polypropylene piw (N/cm) | mode | white truck paint piw (N/cm) | mode |
|---|---|---|---|---|---|---|---|---|---|
| Example 25 | 30 | 40 | 30 | 32 (56) | cp | 28 (49) | cp | 30 (52) | cp |

Examples 26-27

Example 1 was repeated, except replacing the 40/40/20 MCH/MAC/HMDS solvent blend with the solvent blend indicated in Table 10.

TABLE 10

| Example | Solvent Blend Weight Ratio MCH | MAC | heptane | tBAC | polycarbonate piw (N/cm) | mode | TPO piw (N/cm) | mode | polypropylene piw (N/cm) | mode |
|---|---|---|---|---|---|---|---|---|---|---|
| Example 26 | 0 | 40 | 60 | 0 | 41 (71) | fs | 41 (71) | fs | 42 (73) | fs |
| Example 27 | 0 | 40 | 40 | 20 | 41 (71) | fs | 42 (73) | fs | 18 (31) | cp |

Examples 28-30 and Comparative Example 10-11

Example 3 was repeated, except replacing AFAR2 as shown in Table 11.

TABLE 11

| Example | AFAR | Calculated Tg | Nylon piw (N/cm) | mode | polypropylene piw (N/cm) | mode | white truck paint piw (N/cm) | mode |
|---|---|---|---|---|---|---|---|---|
| Example 28 | AFAR5 | 55° C. | 38 (66) | fs | 30 (52) | mix | 31 (54) | cp |
| Example 29 | AFAR6 | 47° C. | 36 (63) | fs | 40 (70) | mix | 30 (52) | cp |
| Example 30 | AFAR7 | 12° C. | 31 (54) | cp | 29 (50) | mix | 24 (42) | cp |
| Comparative 10 | AFAR8 | −16° C. | 23 (40) | cp | 20 (35) | mix | 17 (29) | cp |
| Comparative 11 | AFAR9 | −21° C. | 23 (40) | cp | 7 (12) | cp | 15 (26) | cp |

Examples 31-32 and Comparative Example 12

Example 3 was repeated, except varying ATBC as shown in Table 12.

TABLE 12

| Example | Non-volatiles, weight ratio KRATON FG1901/AFAR2/ATBC/A186 | Nylon piw (N/cm) | Nylon mode | polypropylene piw (N/cm) | polypropylene mode | white truck paint piw (N/cm) | white truck paint mode |
|---|---|---|---|---|---|---|---|
| Example 31 | 50/24/24/2 | 37 (64) | cp | 38 (66) | fs | 27 (47) | cp |
| Example 32 | 58/28/12/2 | 40 (70) | mix | 25 (43) | cp | 29 (50) | cp |
| Comparative 12 | 66/32/0/2 | 39 (68) | mix | 16 (28) | mix | 22 (38) | cp |

The invention claimed is:

1. A primer composition comprising a primer component comprising:
    a rubber;
    an amine-functional (meth)acrylic resin; and
    a plasticizer;
    wherein the amine-functional (meth)acrylic resin is a polymerization reaction product of an amine-functional (meth)acryloyl compound and a non-amine-vinyl monomer;
    wherein the amine-functional (meth)acryloyl compound is of Formula (I):

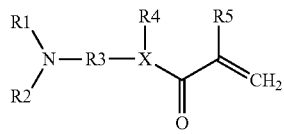

(I)

wherein R1 is hydrogen, alkyl, or aralkyl; R2 is alkyl or aralkyl; or R1 and R2 together with the nitrogen atom with which they are joined may form a 5, 6, or 7 member ring; R3 is alkylene or aralkylene; X is nitrogen or oxygen; R4 does not exist if X is oxygen and is hydrogen, alkyl, aryl, alkaryl, or aralkyl if X is nitrogen; and R5 is hydrogen or methyl;
    or wherein the amine-functional (meth)acryloyl compound is of Formula (II):

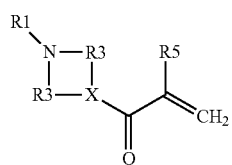

(II)

wherein R1 is hydrogen, alkyl, or aralkyl; each R3 is independently alkylene or aralkylene; X is nitrogen; and R5 is hydrogen or methyl; or combinations thereof.

2. The primer composition of claim 1, wherein the amine-functional (meth)acrylic resin has a calculated Tg greater than or equal to 12° C.

3. The primer composition of claim 1, wherein the non-amine-vinyl monomer is selected from the group consisting of a (meth)acrylic acid, a (meth)acrylic acid ester, a (meth)acrylamide, a vinyl ester, a styrene, a (meth)acrylonitrile, and mixtures thereof.

4. The primer composition of claim 1, wherein the non-amine-vinyl monomer is a (meth)acrylic acid ester of a C1 to C18 alcohol.

5. The primer composition of claim 1, wherein the rubber comprises a block copolymer of a styrene and an alkene.

6. The primer composition of claim 1, wherein the rubber comprises a styrene-ethylene/butylene-styrene block copolymer grafted with maleic anhydride.

7. The primer composition of claim 1, wherein the plasticizer is of Formula III:

$$(R-X-)_n Z \qquad (III)$$

wherein:
    each R may be hydrogen, C1-C14 alkyl, aryl, alkaryl, or aralkyl;
    each optionally interrupted by oxygen, nitrogen, carbonyl, carboxyl, or carbamide;
    each X may be oxygen, nitrogen, carbonyl, carboxyl, or carbamide;
    Z may be a hydrogen, C1-C14 alkyl, aryl, alkaryl, aralkyl, C1-C14 alkylene, arylene, alkarylene, aralkylene; each optionally interrupted by oxygen, nitrogen, carbonyl, carboxyl, or carbamide; and
    n is an integer of 1 to 5.

8. The primer composition of claim 7, wherein n is an integer of 1 to 4.

9. The primer composition of claim 7, wherein the plasticizer is selected from at least one of the following a benzoic acid ester, a myristic acid ester, a citric acid ester, an acetic acid ester, a succinic acid ester, a gluratic acid ester, an adipic acid ester, a sebacic acid ester, and combinations thereof.

10. The primer composition of claim 1, wherein the plasticizer is selected from at least one of the following a benzoic acid ester, a myristic acid ester, a citric acid ester, and combinations thereof.

11. The primer composition of claim 1, wherein the primer component comprises:
    35 wt. % to 70 wt. % of the rubber;
    20 wt. % to 35 wt. % of the amine-functional (meth)acrylic resin; and
    10 wt. % to 40 wt. % of the plasticizer,
    wherein the weight percentages are all based on the total weight of the primer component.

12. The primer composition of claim 1 wherein the primer component comprises:
    40 wt. % to 60 wt. % of the rubber;
    20 wt. % to 35 wt. % of the amine-functional (meth)acrylic resin; and
    15 wt. % to 35 wt. % of the plasticizer,
    wherein the weight percentages are all based on the total weight of the primer component.

13. The primer composition of claim 12 further comprising a liquid carrier.

14. The primer composition of claim 13 wherein the liquid carrier is one or more solvent.

15. The primer composition of claim 14, wherein the primer composition comprises:
   1 wt. % to 25 wt. % of the primer component; and
   75 wt. % to 99 wt. % of the solvent,
   wherein the weight percentages are all based on the total weight of the primer composition.

16. The primer of claim 14, wherein the primer composition comprises:
   2 wt. % to 7 wt. % of the primer component; and
   93 wt. % to 98 wt. % of the solvent,
   wherein the weight percentages are all based on the total weight of the primer composition.

* * * * *

UNITED STATES PATENT AND TRADEMARK OFFICE
CERTIFICATE OF CORRECTION

PATENT NO. : 10,640,656 B2  
APPLICATION NO. : 16/061356  
DATED : May 5, 2020  
INVENTOR(S) : Dean Moren Page 1 of 1

It is certified that error appears in the above-identified patent and that said Letters Patent is hereby corrected as shown below:

Column 3  
Line 4, Delete "gluratic" and insert -- glutaric --, therefor.

Column 6  
Line 5, Delete "gluratic" and insert -- glutaric --, therefor.  
Line 26, Delete "http.//" and insert -- http:// --, therefor.  
Lines 42 and 44, Delete "tartarate" and insert -- tartrate --, therefor.

Column 8  
Line 18, Delete "component ," and insert -- component, --, therefor.

Column 9  
Line 66, Delete "gluratic" and insert -- glutaric --, therefor.

Column 20  
Line 45, In Claim 9, delete "gluratic" and insert -- glutaric --, therefor.

Signed and Sealed this  
Twenty-fifth Day of August, 2020

Andrei Iancu  
*Director of the United States Patent and Trademark Office*